Feb. 9, 1965          R. TAYLOR          3,168,828
SPECIAL CONCRETE BLOCK FOR WATER METER
Filed July 10, 1961                                3 Sheets-Sheet 1

INVENTOR
ROBERT TAYLOR
BY
Irons, Birch, Swindler & McKie
ATTORNEYS

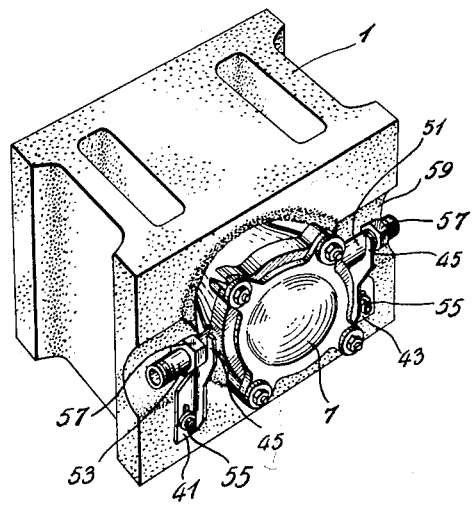
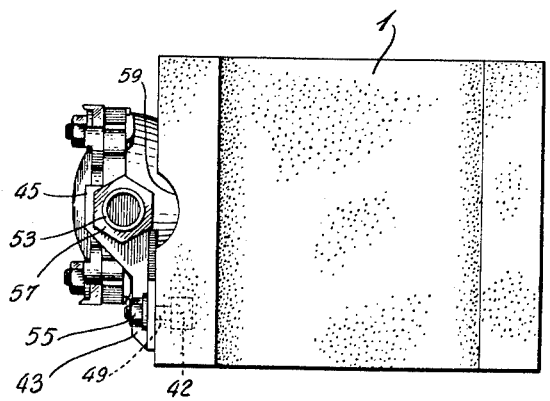

Feb. 9, 1965  R. TAYLOR  3,168,828
SPECIAL CONCRETE BLOCK FOR WATER METER
Filed July 10, 1961  3 Sheets-Sheet 3

INVENTOR
ROBERT TAYLOR
BY
Irons, Birch, Swindler & McKie
ATTORNEYS

United States Patent Office

3,168,828
Patented Feb. 9, 1965

3,168,828
SPECIAL CONCRETE BLOCK FOR WATER METER
Robert Taylor, Burlington, Ontario, Canada, assignor to Firestone Tire and Rubber Company of Canada, Ltd., Hamilton, Ontario, Canada
Filed July 10, 1961, Ser. No. 123,166
2 Claims. (Cl. 73—201)

The present invention relates to a novel and useful building block. More particularly, it relates to a building block which is particularly adapted for the mounting of a water meter.

Because of climatic conditions, water meters have to be installed inside houses, usually in the cellar and often in a location difficult of access and poorly lit, making the readings difficult. It is also necessary for the utility company man to enter homes in order to make the readings. If the home owner is absent, the man has to call again. Such a practice is therefore considerably time consuming and it is an object of the invention to overcome this difficulty by providing a unit whereby the water meter can still be installed inside the house but is made readable from the outside.

A further object of the invention lies in the provision of a mounting unit for a water meter which is extremely simple and made of a very small number of parts which require no maintenance.

These objects are accomplished by the present invention which provides a support, adapted for the mounting and reading of a water meter having a neck at one end thereof provided with a reading dial, which comprises in combination a building block containing a cavity extending therethrough; a resilient collar mounted within said cavity at one end thereof; said collar having an inner size to fit over the neck of the meter; a window secured within said collar forwardly of the neck and dial; and means, at the other end of said cavity, adapted to support the other end of the meter. In a preferred embodiment of the present invention the building block is a moulded concrete block and the window in said block is an air-evacuated multi-pane window.

The present invention also provides a building block, adapted for the mounting and reading of a water meter having a neck at one end which is provided with a reading dial, said block containing a cavity extended therethrough with an annular groove located towards one end of the said cavity.

When such a block is suitably placed in a foundation wall, it becomes possible to read the meter from the outside while keeping it sheltered.

Other advantages and objects of the invention will be found as the following description proceeds having regard to the accompanying drawing of a preferred embodiment wherein:

FIG. 3 shows a further perspective view but from the other end of the block;

FIG. 4 is a side elevation view;

Figure 1:
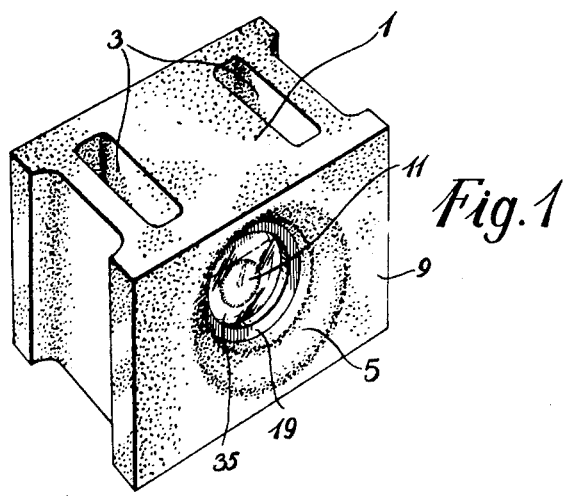
FIG. 1 is a perspective view of the block of my invention viewed from one end.
Figure 2:
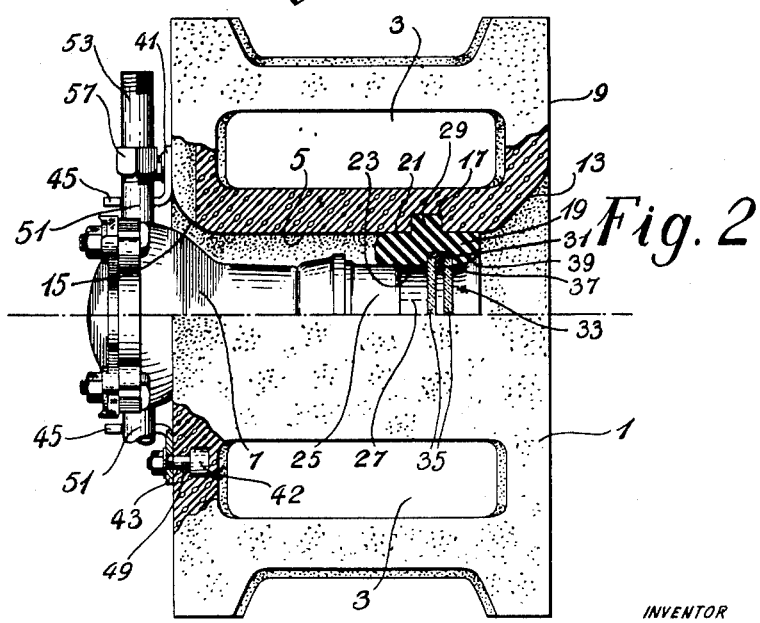
FIG. 2 is a plan view, partly in section.

The drawings show that the invention comprises a concrete block 1, which may be hollowed out as at 3, through which extends a cavity 5, preferably cylindrical. As best illustrated in FIG. 2, the cavity 5 is for the reception of a water meter 7. In use the block 1 is made part of the building foundation with face 9 looking out so that dial 11 of meter 7 is readable from the outside.

Cavity 5 preferably flares out, as at 13, on the outward side thereof to facilitate readings and to prevent damage to window 33, both in place and in transit, particularly during construction. It is also curved or flared, as at 15, on the inward side to accommodate the bulging end of meter 7. Finally, the cavity is provided, adjacent the flaring out end 13, with a channel 17, preferably annular and square in cross-sections, for the reception of a supporting collar 19 which is made of resilient material, preferably rubber.

Collar 19 has an outer surface 21 that corresponds to that of cavity 5 and an inner surface or bore 23 of a shape to tightly fit over the neck 25 of meter 7. The tightness of the fit should be such as to prevent dust and air to enter chamber 27 between dial 11 and window 33.

This collar 19 is secured into cavity 5 by means of a radial shoulder 29 located centrally of outer surface 21 and insertable into channel 17.

Cut out of inner surface or bore 23 of the collar, is an annular groove 31 for the reception of a thermopane window 33. Window 33 consists of two panes 35 spaced apart and held together by means of a retaining ring 37. Air is evacuated between the panes 35 to prevent fog and frost from forming thereon. Reading of the dial may therefore be done at all times, independently of the weather conditions.

Window 33 should be made as a unit and tightly fit into its receiving groove 31 so as to render chamber 27 completely dust and air tight. To help the insertion of window 33, the end of bore 23 from which it is inserted, should flare out, as at 39.

It should be noted that groove 31 is positioned off center, or offset from the center of collar 19 so as to leave the greatest possible bearing area for the neck of meter 7, at the other end. It is to be noted that the collar is of substantial extent along its length, particularly between the groove and the meter dial supporting end to provide a substantial bearing area for securely supporting the dial end of the meter.

Figure 6:
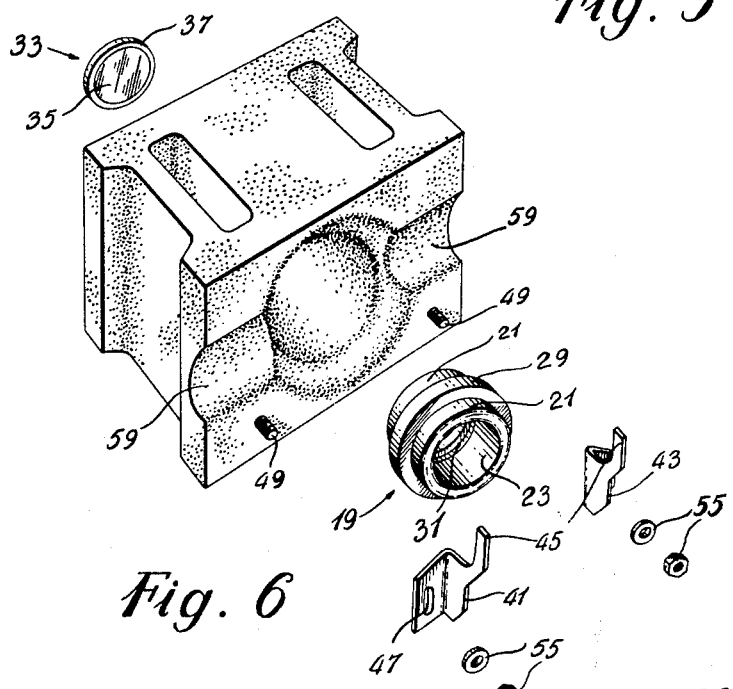
FIG. 6 is an exploded, perspective view, illustrating the component parts of the block of my invention.

To hold the other end of the meter 7 into position of the innerward side of the block, left and right hand brackets, 41 and 43 respectively, are provided (FIG. 6).

Figure 5:
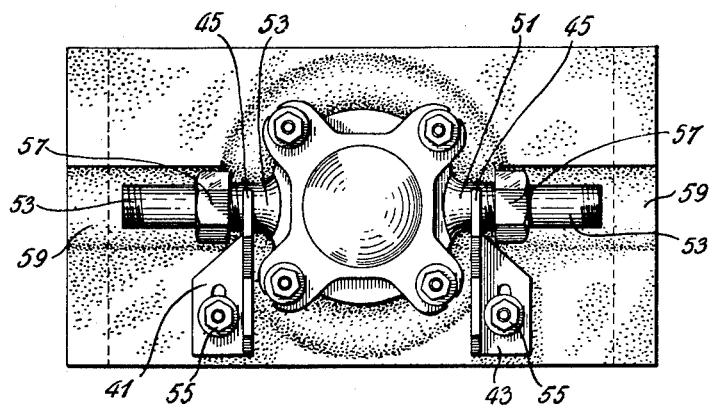
FIG. 5 is an end view, in elevation, showing the end of the meter opposite the dial end.

Each bracket is made out of an angle plate with an upstanding retaining finger 45 on one wing. The other wing has an elongated slot 47 into which is received a stud 49 set in the concrete block during casting. Nut and bolt assemblies 55, fix the brackets in position. Inlet and outlet nipples, 51 and 53 respectively, will come to rest on these brackets as shown in FIGS. 3, 4 and 5.

Stud 49 instead of being set in the concrete during casting could be screwed into two threaded cadmium-plated inserts 42: the latter having been inserted into position before pouring of the concrete.

In order to permit the screwing of nuts 57 to join the nipples 51, 53 to the inlet and outlet pipes, it may be necessary to provide cored out areas 59 on either side of cavity 5, in the nature of concave recesses extending from the outer edges of the block to the cavity. This will allow the meter to be set as far forward in the block as possible as an aid to the best visibility.

A compression fit of neck 25 of meter 7 in collar 19 is necessary to provide adequate support and proper alignment of the meter dial. It will also keep airspace or chamber 27 dust free so as to provide easier reading of the dial.

The rubber collar section should be made large to afford a large area that will resist deterioration over many years. Ample compression within the rubber will result to take care of manufacturing tolerances. With such a rubber collar, a rigid assembly will be obtained, yet having sufficient cushioning effect to protect the meter.

As a protection against corrosion, all metal parts should be plated, preferably cadmium plate.

Many other equivalent modifications will be apparent to those skilled in the art from a reading of the foregoing without a departure from the inventive concept.

What is claimed is:

1. A meter support and meter mounted thereon to be incorporated in the wall of a building with the meter disposed interiorly of the building and readable from the exterior of such building comprising in combination a block of molded building material providing an outside face to form an exterior portion of the building wall when incorporated in the structure of the building and an inside face for mounting a meter, said outside face, the inner end of said collar supporting and fitting over said dial end of said meter, a meter having a dial at one end to register the meter reading, mounting means anchored to said inside face of said block, said mounting means being secured adjacent the end of said meter opposite said dial end to support said meter in spaced relation to the walls of said cavity, said meter being mounted on said inside face with said dial end projecting into said cavity, a resilient collar mounted within said cavity adjacent said outside face, the inner end of said collar supporting and fitting over said dial end of said meter, and window means mounted within said collar between said dial end of said meter and said outside face to close said cavity to the outside atmospheric elements.

2. A building block for mounting a meter with a projecting portion carrying a reading dial at one end thereof, the block to be incorporated in the wall of a building with the meter disposed internally of the building and readable from the exterior of such building, said block comprising a body having a cavity extending therethrough, said cavity having an inner and an outer end, an annular channel in the wall of said cavity adjacent said outer end, an annular resilient collar of substantial extent along its length having an outer surface substantially identical to the wall of said cavity, a shoulder projecting from said outer surface intermediate the ends of said collar, said shoulder being received within said channel and tightly securing said collar within said cavity, said collar defining a bore at one end thereof of substantially constant cross section and of a predetermined size to tightly fit over and support the dial end of the meter, an annular groove in the inner surface of said collar adjacent the end opposite from said meter dial supporting end, said collar having an elongated portion of substantial length extending from said groove toward the inner end of said cavity to provide a substantial bearing area in said bore for securely supporting the dial end of the meter, a pair of spaced window panes secured and sealed in said groove closing said outer end of said cavity, means embedded in the inner face of said block to facilitate mounting the end of the meter opposite the dial end, and concave recesses formed in the inner face of said block extending from the outer edges of said block to said cavity to receive inlet and outlet connections projecting outwardly from the meter.

References Cited by the Examiner

UNITED STATES PATENTS

| | | | |
|---|---|---|---|
| 1,883,507 | 10/32 | Bond et al. | 73—201 |
| 2,193,853 | 3/40 | Axe | 20—56.5 |
| 2,532,990 | 12/50 | Blaha | 50—263 |

FOREIGN PATENTS

| | | |
|---|---|---|
| 496,359 | 11/19 | France. |
| 265,817 | 2/27 | Great Britain. |
| 463,953 | 4/37 | Great Britain. |
| 1,094,496 | 12/54 | France. |

JACOB L. NACKENOFF, *Primary Examiner.*

HENRY C. SUTHERLAND, *Examiner.*

UNITED STATES PATENT OFFICE
CERTIFICATE OF CORRECTION

Patent No. 3,168,828 February 9, 1965

Robert Taylor

It is hereby certified that error appears in the above numbered patent requiring correction and that the said Letters Patent should read as corrected below.

Column 3, lines 13 and 14, strike out "said outside face, the inner end of said collar supporting and fitting over said dial end of said meter," and insert -- said block having a cavity extending therethrough from said inside face to said outside face, --.

Signed and sealed this 26th day of October 1965.

(SEAL)
Attest:

ERNEST W. SWIDER
Attesting Officer

EDWARD J. BRENNER
Commissioner of Patents